United States Patent [19]

Dahl

[11] 4,111,908
[45] Sep. 5, 1978

[54] POLYKETONES AND METHODS THEREFOR

[75] Inventor: Klaus J. Dahl, Palo Alto, Calif.

[73] Assignee: Raychem Corporation, Menlo Park, Calif.

[21] Appl. No.: 597,496

[22] Filed: Jul. 21, 1975

Related U.S. Application Data

[60] Division of Ser. No. 366,326, Jun. 4, 1973, Pat. No. 3,914,218, which is a division of Ser. No. 218,446, Feb. 16, 1971, abandoned, which is a continuation-in-part of Ser. No. 115,824, Feb. 16, 1971, abandoned.

[51] Int. Cl.² ............................................. C08G 67/00
[52] U.S. Cl. .................................................... 528/361
[58] Field of Search ......................... 260/47 R, 61, 50

[56] References Cited

U.S. PATENT DOCUMENTS

| | | | |
|---|---|---|---|
| 3,441,538 | 4/1969 | Marks | 260/49 |
| 3,764,583 | 10/1973 | Newton et al. | 260/49 |

*Primary Examiner*—Lester L. Lee
*Attorney, Agent, or Firm*—Lyon & Lyon

[57] ABSTRACT

Polymers whose repeating units are of structure

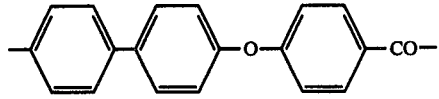

are prepared by polymerization of novel biphenylyloxy-benzoyl moiety-containing monomers reactive in HF and $BF_3$ to form carboxonium ion-containing intermediates (e.g., biphenylyloxybenzoyl halide monomer), preferably in the presence of aromatic capping agents sufficient in amount to yield polymer of mean inherent viscosity from about 0.5 to 1.7. Such polymer may be employed, e.g., for insulative coating of conductive articles such as wire and cable.

25 Claims, No Drawings

POLYKETONES AND METHODS THEREFOR

CROSS-REFERENCE TO RELATED APPLICATONS which was

This is a division of my copending application Ser. No. 366,326 filed June 4, 1973, now U.S. Pat. No. 3,914,218, for Polyketones and Methods Therefor, which is a division of my copending application Ser. No. 218,446 filed Feb. 16, 1971 (now abandoned) for Polyketones and Methods Therefor whichwas a continuation-in-part of my application Ser. No. 115,824 filed Feb. 16, 1971 (now abandoned) for Polyketones and Methods Therefor, and is related to and incorporates by reference the disclosures in my applications Ser. Nos. 218,465 (now abandoned) and 218,485 (now U.S. Pat. No. 3,751,398), each filed Feb. 16, 1971.

BACKGROUND OF THE INVENTION

Aromatic polyketones are known to enjoy good resistance to thermal degradation. Bonner, in U.S. Pat. No. 3,065,205, suggests the Friedel-Crafts catalyzed polymerization of certain reactants to yield polyketones, listing as typical Friedel-Crafts catalysts ferric chloride and boron trifluoride. The reactants proposed fall into two classes, the first consisting of aryl ethers and polynuclear aromatic compounds, a member of which is heated with a member of a second class consisting of aliphatic and aromatic diacyl chlorides. The basic reactions taught by this patent, then, can be summarized as follows:

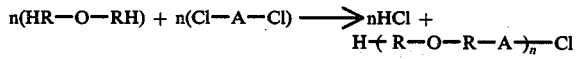

and

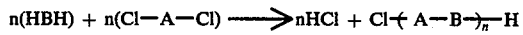

where HBH is a polynuclear aromatic hydrocarbon such as naphthalene, HR-O-RH is an ether such as diphenyl ether, and Cl-A-Cl is a diacyl chloride such as terephthaloyl chloride or phosgene. When phosgene and diphenyl ether are reacted, the resulting polymer will contain the repeating unit

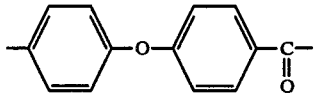

An entirely different approach is taken by Farnham and Johnson in British Pat. No. 1,078,234 (corresponding to U.S. application Ser. No. 295,519, filed July 16, 1963). Here, polyarylene polyethers are produced by reaction of an alkali metal double salt of a dihydric phenol with a dihalo benzenoid compound. The dihydric phenol may contain a keto group — thus, 4,4'-dihydroxy benzophenone is claimed to give rise to a polyketone (See claim 15 of the British patent).

The same repeating unit is disclosed in British Pat. No. 971,227 to arise from the reaction of diphenyl ether with phosgene, from the polycondensation of diphenyl ether-4-carbonyl chloride, and from the reaction of diphenyl ether with diphenyl ether-4,4'-dicarbonyl chloride.

A number of patents dealing with improved methods of making polyketones have since issued. Thus, for example, processes disclosed in U.S. Pat. Nos. 3,441,538 and 3,442,857 derive advantage by resort to hydrogen fluoride-enhanced boron trifluoride catalysis, a system earlier recognized in *Boron Fluoride and its Compounds as Catalysts,* etc., Topchiev et al, Pergamon Press (1959) p. 122; *J. Org. Chem.* 26, 2401 (1961); and *I&E Chem.* 43, 746 (1951). A further patent dealing with an improved process is British Patent No. 1,086,021. The foregoing are incorporated herein by reference to illuminate the background of this invention.

In my above-mentioned copending applications, Ser. No. 115,824 and Ser. No. 214,465, are described the manner in which melt processable polymers having the phenoxybenzoyl repeating unit may be obtained. Such polymers are eminently suited to insulative coating of conductive articles such as wire and cable. These applications, however, sometimes require performance without substantial alteration of physical properties at temperatures in excess of the melt point or range of the poly(benzophenone ethers) discussed above. It would be advantageous, then, to secure polyketones having significantly greater melting temperatures, which polymers yet share the other desirable properties of previously known polyketone materials.

BRIEF SUMMARY OF THE INVENTION

By this invention, there are provided melt processable polymers whose repeating units are of structure

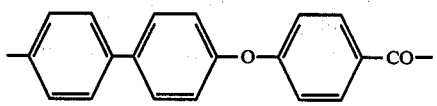

and monomers and methods for securing the same. The polymers may be obtained at inherent viscosities such that elongation to rupture of room temperature when elongated at a rate of 200 percent per minute (hereafter, "elongation") is greater than about 50%, suiting them for insulative coating of electrically conductive articles. Crystalline polymers produced according to this invention attain the melt phase at temperatures substantially above the melt point of poly(benzophenone ether), e.g. at temperatures on the order of 70° C greater, significantly extending the available range of high temperature applications. In addition, the crystalline polymers of the invention exhibit enhanced solvent resistance relative to poly(benzophenone ether), and the more amorphous polymers of the invention may be cross-linked to the same end.

DETAILED DESCRIPTION OF THE INVENTION

The monomers which may be employed in forming the polymers of the invention are those which include a biphenylyloxybenzoyl moiety, viz.:

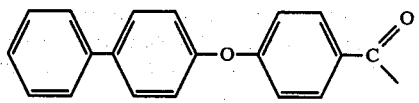

which is reactive in hydrogen fluoride and boron trifluoride to yield a carboxonium-ion-containing intermediate, e.g., biphenylyloxybenzoyl halides, biphenylyloxybenzoic acid and the $C_1$–$C_3$ alkyl esters thereof. Where the esters are employed, the methyl and ethyl esters are preferred as permitting polymerization rate best suited to production in merchant quantities.

The novel p-biphenylyloxybenzoic acid monomer of the invention is preferably obtained by Ullmann condensation of p-hydroxybiphenyl (commercially available as a byproduct of phenol synthesis) and p-chlorotoluene to yield the known compound p-biphenylyloxytoluene, which is in turn subjected to cobalt acetate-catalyzed oxidation to form the intended product. Treatment of p-biphenylyloxybenzoic acid with thionyl chloride affords the corresponding acid chloride, which in turn may be converted to the acid fluoride by reaction with anhydrous hydrogen fluoride. The acid ester monomers are obtained at reflux temperature by reaction of the corresponding acid chloride with the appropriate alcohol in the presence of triethylamine, or alternatively by sulfuric acid-catalyzed reaction of the alcohol and p-biphenylyloxybenzoic acid at reflux. The corresponding meta and ortho monomers are similarly obtained, starting from commercially available 3-hydroxybiphenyl and 2-hydroxybiphenyl, respectively. In the case of each monomer, the phenyl terminus is activated toward electrophilic attack by the electron donating properties of ether oxygen, so that monomers of the invention are readily polymerizable.

The acid chloride is the preferred monomer from the standpoint of polymerization rate. NMR studies of acid fluoride, ester and acid polymerizations show formation in the HF-BF$_3$ polymerization medium of a carboxonium ion-containing intermediate. In the case of the preferred acid chloride monomer, that intermediate appears to be the highly reactive tetrafluoroborate, i.e.:

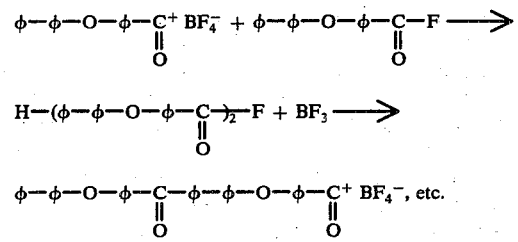

Hydrogen fluoride is employed in every case as solvent for the formed polymer and participates in the polymerization reaction as well. Thus, in the case depicted above the mechanism of polymerization appears to include conversion of the acid chloride monomer to an acid fluoride intermediate. Polymerization may be had by admitting BF$_3$ to a hydrogen fluoride solution containing from about 3 to 30% by weight, preferably from about 15 to 25% by weight monomer. As an alternative to the use HF alone, BF$_3$ may be admitted to a solution of monomer in HF and liquid sulfur dioxide, as is discussed hereinafter.

Generally, polymerization is had in the presence of at least one equivalent of boron trifluoride per equivalent of monomer. Since the transient intermediate is rate determining, more boron trifluoride, e.g., from about 1.25 to about 2 or more moles of BF$_3$ for each mole of monomer is preferably used. In the case of biphenylyloxybenzoic acid and acid ester monomers, the respective water and alcohol byproducts of polymerization associate with BF$_3$ in equimolar ratio, so that for consistent obtainment of polymer within the preferred range of inherent viscosity in the case of these monomers, at least 2 moles of BF$_3$ per mole of monomer is desirably employed.

The preferred p-biphenylyloxybenzoyl monomers form crystalline homopolymers, and those monomers may be copolymerized with their meta and/or ortho isomers in amounts yielding not more than 20% ortho and/or meta repeating units while retaining a useful degree of crystallinity. Preferably where considerable crystallinity is desired, not more than about 15% ortho and/or meta comonomer is employed. In such amounts, the comonomers tend to reduce melt viscosity, facilitating extrusion. The crystalline homopolymers of the invention exhibit melt points on the order of 70° C greater than poly(benzophenone ether), extending the range of high temperature employments to which the polymers may be put, and in the case of all polymers with the additional phenyl moiety in the biphenylyloxybenzoyl repeating unit substantially increases the glass transition temperatures. Surprisingly, that additional moiety in the repeating unit substantially stiffens and rigidifies the polymer without adversely affecting elongation, which commonly is greater than 100%. Wire and cable insulation must necessarily exhibit elongation greater than 50% in order that the article may be twisted about itself without stress cracking of its insulation and this is also necessary for other polymer applications. Of course, polymers with elongation less than 50% may be otherwise employed, as in engineering plastics, films and coatings applied by solution coating or plasma techniques. Parenthetically, the polymers of the invention appear to be especially UV-resistant, suggesting their employ in weather resistant coating.

To obtain melt processable polymer, mean inherent viscosity should be regulated to within the range from about 0.5 to about 1.7. Below 0.5, the polymer is undesirably brittle, while above 1.7 rough extrudate may be expected. Most preferably, inherent viscosity is in the range 0.9 – 1.3, while maximum elongation is obtained above about 1.2.

Inherent viscosity, and therefore melt processability, is controlled by the judicious employment of selected aromatic capping agents. The capping agent terminates polymerization through Friedel-Crafts catalyzed acylation reaction with the active polymer chain, e.g.:

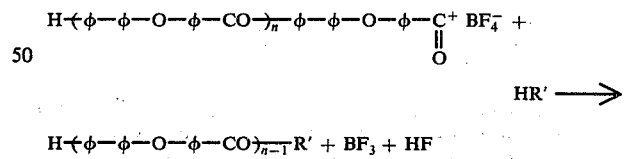

where R' is the residue of the capping agent.

It will be apparent that the capping agent should enjoy reactivity toward acylation of the same order of magnitude as that of the monomer, and it has been found that for effective molecular weight control in the molecular weight range which provides melt processable polymer the capping agent should enjoy reactivity to acetylation (relative to benzene reactivity equal to 1) greater than about 150. For example, the literature [Cf. Kimoto, *J. Pharm. Soc. Japan* 75, 727 (1955) and Brown et al, *J. Am. Chem. Soc.* 81, 5929 (1959)] yields the following values for relative rate of acetylation in the system CH$_3$COCl/AlCl$_3$:

TABLE I

| AGENT | RELATIVE RATE OF ACETYLATION |
| --- | --- |
| Benzene | 1.00 |
| Biphenyl | 205 |
| 4-acetyldiphenyl | 448 |
| Diphenyl ether | 11,600 |
| 4-methyldiphenyl ether | 81,000 |

The aromatic capping agent employed is preferably non-aliphatic and most preferably non-ring-substituted, as by nitro, methyl, hydroxy, methoxy, methoxy carbonyl or acetyl where high temperature polymer performance is desired. In such case, it will readily be appreciated that agents subject to oxidative or thermal degradation are to be avoided as giving rise to discolored polymer, etc. Most generally, any condensed polynuclear aromatic system or aryloxy-or aryl-substituted benzene of sufficient reactivity to acylation and soluble in the reaction medium can be employed. Preferred capping agents are biphenyl and diphenyl ether. Within the range of inherent viscosity required for melt processability, log (inherent viscosity) appears to be linearly related to log (mole percent capping agent). Thus, in the case of the preferred p-biphenylyloxybenzoyl chloride monomer, molecular weight control can be described by the equation $$\eta inh = 1.33 \text{ (mole \% biphenyl)}^{-0.81}$$

Most commonly, about one mole percent capping agent is employed.

It has also been found that, if polymer within the requisite range of mean inherent viscosity and yet having tensile elongation to break of at least about 50% at 25° C is to be obtained, polymerization must be conducted in such fashion as to prevent polymer contamination by transition metals, e.g., Fe, Cr, Co, Ni, etc., since these are believed to give rise to premature crosslinking and in any case provide polymer within the requisite range of inherent viscosity but of unduly low elongation.

Accordingly, reaction should proceed in an essentially transition metal-free environment, as in plastic (e.g., polvtetrafluoroethylene (PTFE), polyethylene, polychlorotrifluoroethylene (PCTFE) plastic-coated, aluminum or other such vessels. Most preferably, the environs of polymerization are entirely non-metallic.

Where polymerization is conducted in HF alone, the temperature of polymerization is preferably between about 0° C and 50° C, most preferably between about 0° C and room temperature. Polymerization temperatures equal to or greater than about 100° C should be avoided, while temperatures less than 0° C will, of course, decrease polymerization rate. The preferred course, however, is to conduct polymerization in the presence of, e.g., 50% by volume liquid $SO_2$, in which event temperature is maintained at about 0° C to maintain the $SO_2$ in the liquid state at the pressure prevailing in the reaction vessel. As will appear from a comparison of Examples 2 and 6, infra, the addition of $SO_2$ to the polymerization medium markedly enhances solubility of the polymer therein. Additionally, where polymer is recovered by precipitation in a relative non-solvent, e.g. acetone, methylethylketone, dimethyl formamide, dimethyl acetamide, N-methylpyrrolidone, acetic acid or chlorinated acetic acid, the liquid $SO_2$ minimizes undue temperature rise associated with heat of dilution of the hydrogen fluoride in the solvent. $SO_2$ also appears to deprotonate ketone moieties of the polymer, so that $BF_3$ is held not in ionic association therewith, but more loosely in a donor-acceptor complex.

Finally, in the preferred spray drying workup procedure, $SO_2$ affords polymer lighter in color than arises from spray drying from HF alone. Used in lieu of HF for dilution to solids contents best suited to spray drying, $SO_2$ reduces corrosion of spray dryer walls and achieves substantial economies by reason of its relatively lower cost. While a detailed description of $SO_2$ spray drying appears in my concurrently filed application Ser. No. 218,483, the presently preferred process may be briefly described as entailing dilution of the polymer solution to about 1-2% solids, providing a solution containing a major proportion, preferably 90-99% by volume $SO_2$. The dilute solution is conveyed under pressure of, e.g., 20 psig at −6° C to a two fluid nozzle, from which it is sprayed and contacted with hot air or gaseous $SO_2$. Inlet gas temperatures on the order of 199°-230° C afford particulate polymer having but about 2-5% by weight fluorine volatiles. Preferably, fluorine content of the spray dried product is thereafter reduced to less than 100 ppm in a vacuum oven operating at, e.g., 140° C.

The melt processable polymer of the invention can be readily extruded onto electrical conductors, most commonly in the case of wires in coats of from about 4 to 12 mils in thickness.

Polymers whose repeating units consist of p-biphenylyloxybenzoyl moieties are substantially less soluble than poly(benzophenone ether) and hence more resistant to solvent stress crazing. Amorphous polymers formed from ortho- and meta- biphenyloxybenzoyl monomers are somewhat more soluble, but may be made solvent resistant by thermal crosslinking at temperatures of from about 300°-600° C after extrusion onto wire, cable or the like. Even where crystalline parahomopolymer is extruded onto wire, advantage may be taken of thermal crosslinking, and in all cases, abrasion resistance, strength, and dimensional stability may be enhanced by annealing extruded coats, as by exposure thereof to temperatures on the order of 250° C for about 2 minutes. It will be appreciated, of course, that both annealing and thermal crosslinking are inversely time and temperature dependent, and suitable times and temperatures for each will readily occur to the art-skilled from the foregoing, all depending upon contemplated service conditions and like considerations.

The invention is further illustrated with respect to the preferred embodiments thereof in the following examples, in which all parts are by weight and temperatures in ° C unless otherwise noted. Throughout, mean inherent viscosity is determined according to the method of Sorenson et al, *Preparative Methods of Polymer Chemistry* Interscience (1968), p. 44 [0.1 g polymer in 100 ml. soln. of conc. $H_2SO_4$ at 25° C].

EXAMPLE 1 p-Biphenylyloxybenzoyl Chloride "Monomer"

The subject compound was prepared by the reaction of thionyl chloride with p-(4-biphenylyloxy)benzoic acid derived by oxidation from p-(4-biphenylyloxy) toluene. The latter compound is secured by the Ullmann condensation of p-chlorotoluene and biphenyl-4-ol. The procedure was as follows.

p-Biphenylyloxybenzoic Acid. A mixture of 1,123 g (6.6 moles) of biphenyl-4-ol. 396 g (6.0 moles) of potassium hydroxide (85%), 1,519 g (12.0 moles) of p-chlorotoluene, and a catalyst mixture consisting of 7.5 g of CuCl, 3.0 g of $CuCl_2$, 3.0 g of $CuCO_3.Cu(OH)_2\ H_2O$, 3.0 g of copper powder, and 18 g of activated alumina were heated to reflux with stirring for 15 hr. The reaction was conducted under a nitrogen blanket. Water of reaction was removed by azeotropic distillation, and when the pot temperature had reached 167°, 70 ml of dimethylacetamide, 6.0 g of CuCl, 3.0 g of $CuCl_2$, 3.0 g of $CuCO_3.Cu(OH)_2.H_2O$, 6.0 g of copper, and 14 g of alumina were added. Refluxing was contained for 4 hr. and approximately 20 ml of p-chlorotoluene was removed by distillation. After an additional 10 hr. of reflux the pot temperature was raised to 230° and 180 ml of p-chlorotoluene was distilled off. The reaction mixture was cooled to about 180° and then poured into ice water with stirring. The resulting precipitate was filtered, washed with water, and recrystallized from ethanol to give 1,303 g (5.0 moles, 76%) of p-biphenylyloxytoluene, mp 97° to 99°. Vacuum distillation followed by recrystallization from ethanol gave colorless platelets of mp 99° to 100° IR (KBr): 1270 $cm^{-1}$ (aryl ether). A 988 g (3.8 moles) sample of this compound was dissolved in 7.5 liters of acetic acid, together with 94.5 g (0.38 mole) of cobalt acetate tetrahydrate, and 3.1 g (0.038 mole) of hydrobromic acid. Oxygen was passed through the solution with stirring and heating to 100°. After approximately 3 hours, the reaction was complete. After cooling to room temperature, the resulting crystalline precipitate was filtered and recrystallized from o-dichlorobenzene to give 799 g (2.75 moles, 72%) of colorless crystals, mp 243 to 244°, IR(KBr): 1700 $cm^{-1}$ (acid carbonyl), 1280 $cm^{-1}$ (aryl ether). Reaction of 798.0 g (2.75 moles) of acid with 399.0 ml (5.50 moles) $SOCl_2$ in 1500 ml benzene (containing 4 drops pyridine) at 60°-70° followed by vacuum distillation (up to 215° at 0.40 mm Hg) yielded 805.7 g (95.0%) colorless crystals of p-(4-biphenylyloxy)benzoyl chloride of mp 93.5°-94.7° and a light-brown forecut of 20.86 g (2.46%).

EXAMPLE 2

Polymerization of p-Biphenylyloxybenzoyl Chloride in HF

A 50 ml poly(chlorotrifluoroethylene) tube was charged with 3.0568 g (9.90 m moles) of p-(biphenyloxybenzoyl chloride), 0.0154 g (0.1 m moles) of biphenyl capping agent and a stir bar. The reaction tube was cooled to −196° C and 10 ml of anhydrous hydrogen fluoride was added. The tube was connected to a poly(chlorotrifluoroethylene) vacuum line (Ioho Kasei Co., Ltd.) and allowed to warm to 0°. Hydrogen chloride evolved and built up to a pressure of 22 psi. The resulting colorless suspension of acyl fluoride in HF was purged with nitrogen at 0° to remove the hydrogen chloride, and it was then pressured up with boron trifluoride to 50 psi and polymerization proceeded over a period of 16 hours at room temperature. Magnetic stirring proved infeasible in view of the sizable solids content of the reaction mixture, so that on 3 occasions the vessel was cooled to 0° C, opened and manually stirred with a spatula. In each case, after stirring, the vessel was again sealed, repressurized with $BF_3$, and brought to room temperature. A dark-red viscous solution resulted, which contained a sizeable amount of solid residue which was diluted with 150 ml hydrogen fluoride. The resulting homogeneous solution was precipitated into rapidly-stirred methanol, to give a colorless, fluffy, solid of inherant viscosity 1.42 (0.1 g/100 ml conc. sulfuric acid, 25° C).

Other acid chloride polymerizations in the presence of varying amounts of biphenyl capping agent affected molecular weight control as shown in the Table.

TABLE

| Mole % biphenyl | ninh (0.1 g/100 ml conc. $H_2SO_4$ at 25°) |
|---|---|
| 0.50 | 2.30±.08 |
| 1.00 | 1.37±.05 |
| 1.50 | 0.94±.045 |

EXAMPLE 3

Preparation and Polymerization of Ethyl p-biphenylyloxybenzoate

Ethanolysis of p-biphenylyloxybenzoyl chloride in the presence of several drops of triethylamine followed by distillation of excess ethanol and triethylamine left a residue of pure para ethyl biphenylyloxybenzoate: colorless crystals, mp 75.7° to 76.5°. Elemental Anal. Calcd. for $C_{21}H_{18}O_3$: C, 79.22; H, 5.70. Found: C, 79.09, H, 5.75. IR (KBr): 1705 $cm^{-1}$ (ester carbonyl), 1280 $cm^{-1}$ (aryl ether).

A 50-ml poly(chlorotrifluoroethylene) tube was charged with 3.1519 g (9.90 m moles) of ethyl p-biphenylyloxybenzoate, 0.0154 g (0.10 m moles) of biphenyl, a stir bar, and 20 ml of anhydrous hydrogen fluoride. The tube was connected to a poly(chlorotrifluoroethylene) vacuum line and the reaction mixture was stirred at room temperature to give a colorless solution within a few minutes. A $BF_3$ pressure of 50 psi was then applied and held for 22 hr at room temperature with occasional opening of the vessel for manual agitation as in Example 2. A dark red viscous solution resulted which contained a sizable amount of solid precipitate. The $BF_3$ pressure was released at 0° and the reaction product was brought into solution by addition of approximately 150 ml of anhydrous hydrogen fluoride. This solution was precipitated into rapidly stirred methanol to yield a colorless fluffy solid with an inherent viscosity of 0.88 (0.1 g/100 ml concentrated sulfuric acid, 25°).

EXAMPLE 4

Preparation and Polymerization of Methyl p-Biphenylyloxybenzoate

Methanolysis of p-biphenylyloxybenzoyl chloride in the presence of several drops of triethylamine, followed by distillation of triethylamine and excess methanol provided methyl p-biphenylyloxybenzoate as a colorless solid melting at 151.5°-152° C. The compound was polymerized with 1 mole % biphenyl capping reagent as in Example 2, yielding colorless polymer of inherent viscosity of 1.03.

EXAMPLE 5

Polymerization of p-Biphenylyloxybenzoic Acid

A 50 ml poly(chlorotrifluoroethylene) tube was charged with 2.874 g (9.90 m moles) of p-biphenylyloxybenzoic acid, 0.0154 g (0.1 mmole) of biphenyl, a stir bar and 20 ml of anhydrous hydrogen flouride. The sample tube was then held under a pressure of 50 psi of $BF_3$ at room temperature for 16 hours. Polymerization proceeded as in Example 2 giving a dark-red viscous solution containing a sizeable amount of solid precipitated material. After a 15 fold dilution with anhydrous hydrogen fluoride and precipitation into methanol, a colorless, fluffy, material was obtained with an inherent viscosity of 1.35.

EXAMPLE 6

Polymerization of p-Biphenylyloxybenzoyl Chloride in a Mixture of Sulfur Dioxide and Hydrogen Fluoride p-Biphenylyloxybenzoyl chloride polymerizes readily in a mixture of sulfur dioxide, hydrogen fluoride, and boron trifluoride to give a homogeneous polymer solution.

A 50 ml poly(chlorotrifluoroethylene) tube was charged with 3.0568 g (9.90 mmoles) of p-biphenylyloxybenzoyl chloride, 0.0154 g (0.10 mmoles) of biphenyl and a stir bar, followed by addition of 10 ml of cold (−78°) hydrogen fluoride containing 50 vol. % sulfur dioxide. The tube was connected to a poly(chlorotrifluoroethylene) vacuum line and allowed to come to room temperature within 2.5 hr. The tube was then cooled to 0° and the pressure was reduced to 2 psi. After permitting the reaction mixture to warm to room temperature, a $BF_3$ pressure of 50 psi was applied and held for 22 hr. A dark-red completely homogeneous polymer solution resulted, which was diluted with a mixture of sulfur dioxide and hydrogen fluoride and then poured into rapidly agitated, cold (−78°) methanol. A white, fluffy solid was obtained, which showed an inherent viscosity of 2.65 (0.1 g/100 ml concentrated sulfuric acid, 25°).

I claim:

1. A homopolymer whose repeating units are of structure

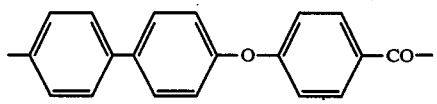

and whose mean inherent viscosity is within the range from about 0.5 to about 1.7 determined from a solution of 0.1 g polymer in 100 ml. concentrated sulfuric acid at 25° C.

2. A homopolymer of structure

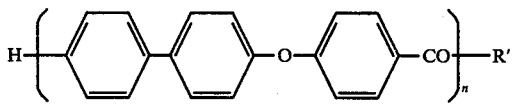

having mean inherent viscosity within the range from about 0.5 to about 1.7 determined from a solution of 0.1 g polymer in 100 ml. concentrated sulfuric acid at 25° C, R' being an aromatic capping agent whose rate of acetylation relative to benzene is greater than about 150 and n being the number of repeating units in the polymer.

3. The process of forming a homopolymer whose repeating units are of structures

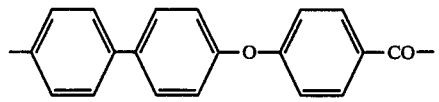

which comprises polymerizing in hydrogen fluoride and boron trifluoride a monomer containing a biphenylyloxybenzoyl moiety reactive in hydrogen fluoride and boron trifluoride to yield a carboxonium ion - containing intermediate, polymerization occuring in the presence of an aromatic capping agent whose rate of acetylation relative to benzene is greater than about 150, said agent being present in an amount sufficient to yield polymer having mean inherent viscosity within the range from about 0.5 to about 1.7 for a solution of 0.1 g of polymer in 100 ml. concentrated sulfuric acid at 25° C.

4. A copolymer whose repeating units are of structure

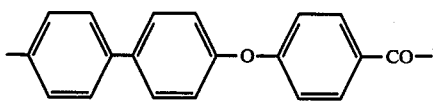

with up to 20% of a second unit —X—CO— wherein —X—CO— is selected from the group consisting of

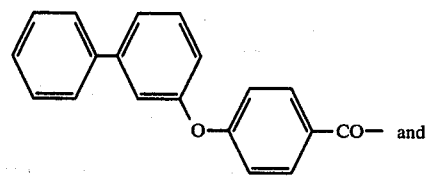

and

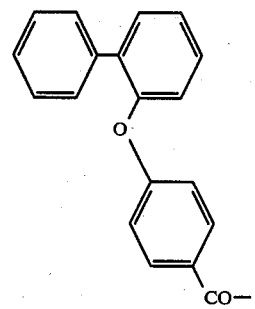

and mixtures thereof, and whose mean inherent viscosity is within the range from about 0.5 to about 1.7 determined from a solution of 0.1 g polymer in 100 ml. concentrated sulfuric acid at 25° C.

5. A copolymer according to claim 4 having an aromatic capping agent, said capping agent having a rate of acetylation relative to benzene that is greater than about 150.

6. A copolymer according to claim 4 with not more than about 15% of said second unit.

7. A copolymer according to claim 6 wherein said second unit is

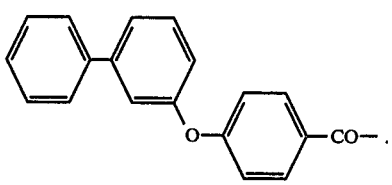

8. A copolymer according to claim 6 wherein second unit is

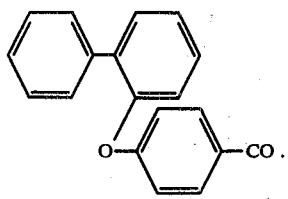

9. A copolymer according to claim 6 wherein said second unit is a mixture of

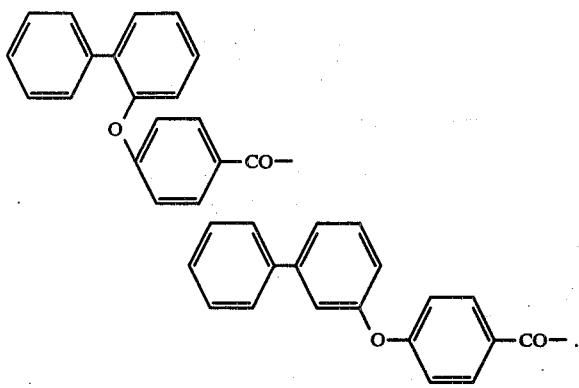

10. A homopolymer according to claim 2 wherein said capping agent is selected from biphenyl and diphenyl ether.

11. A copolymer according to claim 5 wherein said aromatic capping agent is selected from biphenyl and diphenyl ether.

12. The process of forming a copolymer which comprises polymerizing in hydrogen fluoride and boron trifluoride a monomer containing a para-biphenyloxybenzoyl moiety and up to 20% of a second monomer containing a moiety selected from the group consisting of metabiphenyloxybenzoyl, ortho-biphenyloxybenzoyl and mixtures thereof, each of said monomers reactive in hydrogen fluoride and boron trifluoride to form a carboxonium ion to yield an intermediate mixture of carboxonium ions and each of said monomers having a site reactive with said carboxonium ions to form a ketone, polymerization occuring in the presence of an aromatic capping agent whose rate of acetylation relative to benzene is greater than about 150, said agent being present in an amount sufficient to yield a polymeric ketone having mean inherent viscosity within the range from about 0.5 to 1.7 determined from a solution of 0.1 g polymer in 100 ml. concentrated sulfuric acid at 25° C.

13. A process according to claim 12 having not more than about 15% of said second unit.

14. A process according to claim 13 wherein second unit is

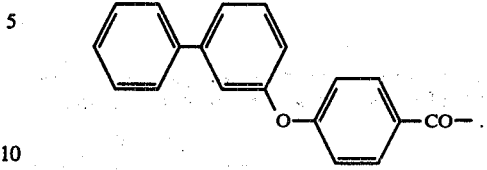

15. A process according to claim 13 wherein second unit is

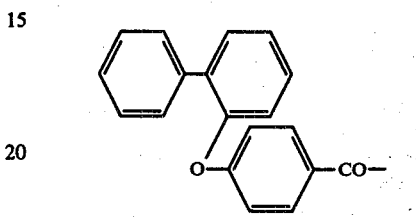

16. A process according to claim 13 wherein said second unit is a mixture of and

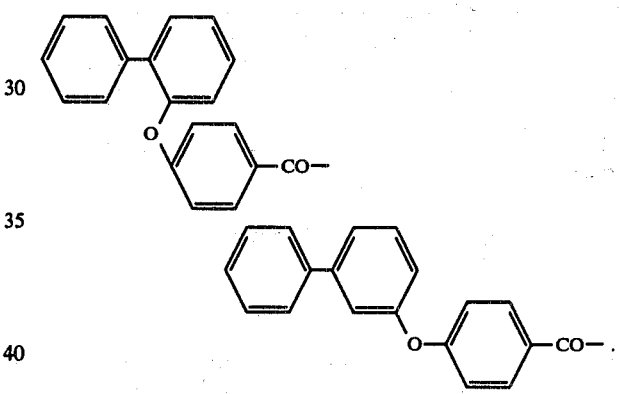

17. A process according to claim 12 wherein said capping agent is selected from biphenyl and diphenyl ether.

18. A process according to claim 13 wherein said capping agent is selected from biphenyl and diphenyl ether.

19. A product of the process of claim 12.
20. A product of the process of claim 13.
21. A product of the process of claim 14.
22. A product of the process of claim 15.
23. A product of the process of claim 16.
24. A product of the process of claim 17.
25. A product of the process of claim 18.

* * * * *